July 1, 1969 L. LAERMER 3,453,611

MEMORY DRUM AND TRANSDUCER ARRANGEMENT WHEREIN THE TRANSDUCER IS SUPPORTED BY A UNIVERSAL JOINT AND INCLUDES MEANS TO PLACE IT IN A SHUTDOWN POSITION

Filed Feb. 23, 1966

LOTHAR LAERMER
*INVENTOR.*

BY Thomas W. Kennedy
ATTORNEY

United States Patent Office 3,453,611

Patented July 1, 1969

3,453,611

MEMORY DRUM AND TRANSDUCER ARRANGEMENT WHEREIN THE TRANSDUCER IS SUPPORTED BY A UNIVERSAL JOINT AND INCLUDES MEANS TO PLACE IT IN A SHUTDOWN POSITION

Lothar Laermer, Paramus, N.J., assignor to General Precision Systems Inc., a corporation of Delaware Filed Feb. 23, 1966, Ser. No. 529,592
Int. Cl. G11b *5/00*
U.S. Cl. 340—174.1 1 Claim

ABSTRACT OF THE DISCLOSURE

The transducer of a memory drum having shoe supports which support shoes carrying magnetic heads has a forward shoe support section and a rear trailing edge pivot. The forward section is supported by a spring biased bar with a screw adjustment for urging the shoe against a gas film between rotor and stator, and, a retractive lever with a pin to engage said bar for shutdown conditions.

The present invention relates to memory transducers, and particularly to a magnetic-head memory transducer.

A prior-art magnetic-head memory transducer includes an information track surface, a shoe having a bearing face with a magnetic head cooperating with said information track surface and movable relative thereto and being separated from said track surface by a gap containing an anti-friction gas-bearing film, and a shoe support with a fixed-type of connection to said shoe.

One problem with said prior-art magnetic-head memory transducer is that it is difficult to minimize a difference in gap thickness from one side to the other side of said shoe bearing surface and also to minimize tilting and misalignment of said shoe relative to said information track surface.

In accordance with one embodiment of the present invention, tilting of said shoe relative to said information track surface is minimized by using a universal-joint type of pivot connection between the shoe support and the shoe instead of a fixed type of connection.

Accordingly, it is one object of the invention to provide a memory transducer, in which tilting and misalignment of the transducer shoe relative to the information track is minimized.

It is another object of the invention to provide a plurality of memory transducers according to the aforementioned object for use in a memory drum.

It is a further object of the invention to provide a retractable-type magnetic-head memory transducer according to the aforementioned object, in which the quality of pickoff signal is improved and in which disturbances due to vibration and shock loads are minimized.

To the fulfillment of these and other objects, the invention provides a memory transducer comprising a shoe having a bearing face with a magnetic head cooperating with an information track surface disposed adjacent thereto and movable relative thereto and being separated from said track surface by a gap containing an anti-friction gas-bearing film, and a shoe support having a universal-joint pivot means connecting said shoe to said shoe support.

Other objects of the invention will become apparent upon reading the following description and accompanying drawings, wherein like parts are designated by like numerals throughout the several views, and wherein.

Figures 1, 4:
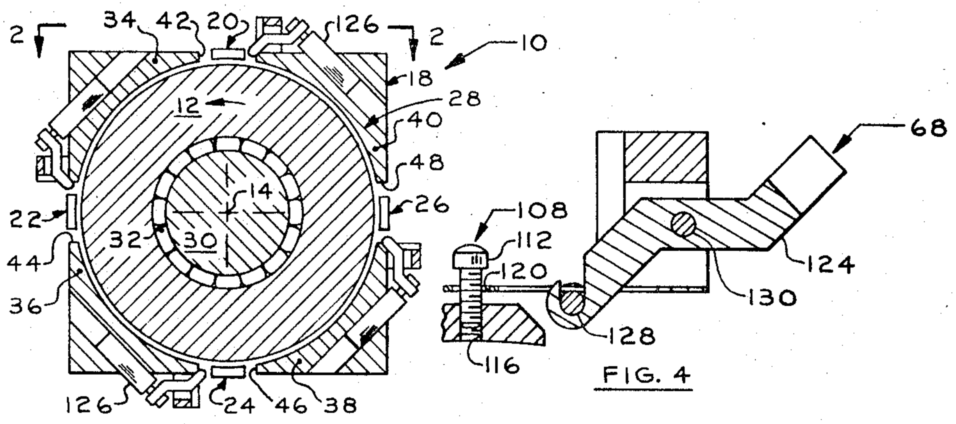
FIG. 1 is a section view of a memory drum embodying features of the present invention.
FIG. 4 is a section view on line 4—4 of FIG. 2.

Referring to FIG. 1, one embodiment of the present invention is a memory drum 10. Drum 10 comprises a rotor 12, which has an elongate axis 14 and which has a read-record information track radially-outer surface 16, and a stator 18, which is coaxial with said rotor 12 along said axis 14 and which has a plurality of read-record transducers 20, 22, 24, 26, supported therefrom.

Stator 18 includes an exterior housing 28, on which transducers 20, 22, 24, 26 are mounted and a shaft 30, which is coaxial with rotor 12 along axis 14 and which is disposed thereagainst, and a ball-bearing 32, which is disposed therebetween and on which rotor 12 is journaled for rotation of rotor 12 relative to stator 18. Housing 28, which has a square, hollow cross-section and which has a rectangular outer shape, includes four walls 34, 36, 38, 40, which respectively have four openings 42, 44, 46, 48, of rectangular shape that respectively receive transducers 20, 22, 24, 26.

Figure 2:
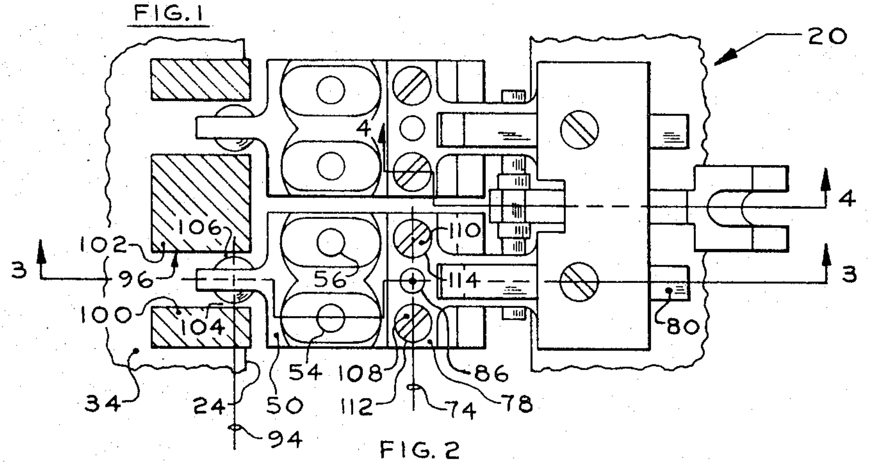
FIG. 2 is a section view on line 2—2 of FIG. 1.
Figure 3:
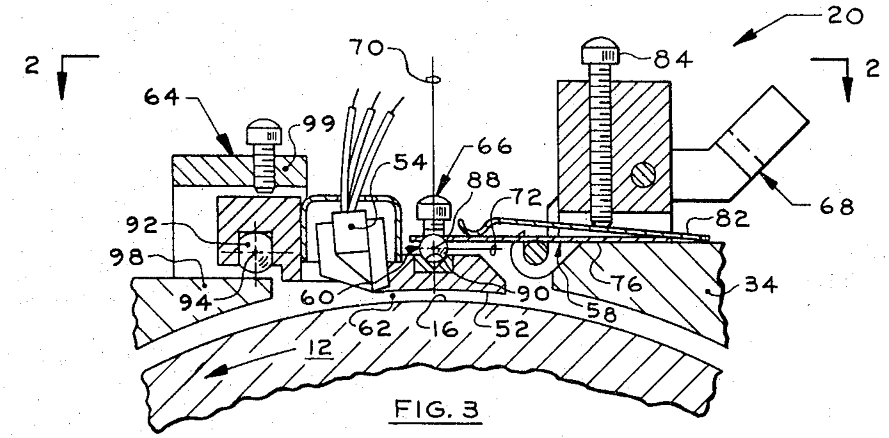
FIG. 3 is a section view on line 3—3 of FIG. 2.

According to the invention, transducer 20 (FIG. 2), which is identical to transducers 22, 24, 26, and which is described hereafter in detail, includes a shoe 50, which has a bearing face 52 with a pair of magnetic heads 54, 56 supported therefrom. Transducer 20 also includes a shoe support 58, which has a universal-joint pivot 60 that connects shoe 50 to shoe support 58.

With this construction, shoe 50 is pivoted in a universal type of movement relative to track surface 16. Face 52 is also separated from track surface 16 by a gap 62, which contains an anti-friction gas-bearing film. Track surface 16 rotates relative to face 52 for cooperation of magnetic heads 54, 56 therewith.

Transducer 20 also has a trailing edge pivot means 64 to minimize a change in approach attitude of shoe 50 and a change in angle of attack of shoe 50 due to positioning and retraction of shoe 50. Transducer 20 also has a shoe suspension means 66 for positioning shoe 50 adjacent to track surface 16 before operating speed and for retracting shoe 50 therefrom prior to shutdown. Transducer 20 also has a retraction drive means 68, which connects to shoe support 58 for raising support 58 before shutdown and for lowering support 58 before operating speed.

Transducer 20 also has a Z-axis 70, which is disposed substantially at right angles to track surface 16 and to face 52, and an X-axis 72, which is substantially parallel to the line of travel of shoe 50 and which intersects Z-axis 70 substantially at right angles thereto, and a Y-axis 74, which intersects axes 70 and 72 substantially at right angles to a plane including said axes 70, 72. Axes 70, 72, 74 intersect substantially at the center of universal-joint pivot 60, as explained hereafter.

Bearing face 52 has a substantially-cylindrical outer shape. Track surface 16, which cooperates with face 52, has a slightly smaller radius than face 52 and is substantially concentric therewith about axis 14. With such construction, an arcuate-shaped gas film is provided in gap 62, said film providing counter-balancing force components acting substantially tangential to surface 16. In this way, shoe 50 is self-aligning in attitude about Z-axis 70 and is substantially non-tilting in angle of attack about Y-axis 74.

Face 52 is preferably substantially symmetrical in width and area about a plane including axes 72 and 70. In this way, moments due to gas film-pressures acting about X-axis 72 cancel each other whereby tilting of shoe 50 about X-axis 72 is minimized.

Shoe support 58 includes a rectangular, flat spring bar 76, which has an inner end 78 that is connected to universal pivot 60, and which has an outer end 80 that is fixedly connected to wall 34. Bar 76, which is similar to a cantilever beam, provides a slight, substantially constant radially-inwardly-directed force on shoe 50.

Shoe support 58 also includes a curved spring strip 82, which is also fixedly connected to wall 34 and which engages flat bar 76 approximately at the mid-span thereof. Strip 82 has an adjusting screw 84, which is threaded into wall 34 and which engages strip 82 for increasing the force of shoe 50 against the gas film in gap 62 and to minimize the thickness of gap 62 whereby the quality of pickoff signal between heads 54, 56 and information track surface 16 is improved.

Universal-joint pivot 60 includes a single pivot ball 86, which is fixedly connected to bar end 78 and which has a pivot center 88 that is the intersecting point of axes 70, 72, 74. Pivot 60 also includes a concave jewel-type bearing face 90, which is fixedly connected to shoe 50. With this construction, ball 86 and bearing 90 are in bearing and in engagement when transducer 20 is in an operating position and are retracted and disengaged when transducer 20 is in a shutdown retracted position.

Trailing-edge pivot 64, which is offset from universal-joint pivot 60, includes a point-bearing pivot ball 92, which is fixedly connected to shoe 50 at the trailing edge thereof relative to its direction of travel, and which has a transverse hinge axis 94, that is disposed substantially parallel to Y-axis 74 at null condition. Pivot 64 also includes a recess 96 in wall 34, which receives ball 92 and which has walls 98, 99 between which ball 92 floats. Recess 96 also has a pair of sidewalls 100, 102, which are disposed on either side of ball 92 and which are respectively separated therefrom by a pair of gaps 104, 106.

With this construction, positioning and retraction of shoe 50 prior to operation and before shutdown and pivoting of shoe 50 about axis 94 and controlling of the thickness of gap 62 are facilitated. In addition, self-alignment of shoe 50 due to gas film pressures in gap 62 is facilitated. Moreover, transverse shock and vibration loads on shoe 50 are resisted by walls 98, 99, 100, 102 whereby disturbance to the alignment of shoe 50 is minimized.

Shoe suspension means 66, which positions shoe 50 prior to operation and which retracts shoe 50 prior to shutdown, connects shoe 50 to shoe support 58. Suspension means 66 includes a pair of stud bolts 108, 110 with respective bolt heads 112, 114, a pair of machine holes 116, 118, which are selectively located in shoe 50 and in which bolts 108, 110 are respectively threaded for fixed-end support thereof. Shoe suspension means 66 also includes a pair of oversize slotted holes 120, 122, which are located in bar 76 and which are coaxially aligned with holes 116, 118 for receiving bolts 108, 110 without contact therewith. When bar 76 is retracted, shoe 50 is suspended by bolt 108, 110 with said bolt heads 112, 114 resting on the upper side of bar 76 whereby tilting of shoe 50 about Y-axis 74 is facilitated.

In this way, shoe 50 can be positioned to approach track surface 16 at a substantially-constant angle of attack thereby preventing shoe 50 from digging into track surface 16.

Retraction drive 68 includes a lever 124 and a solenoid 126. Lever 124 has a lift pin 128 at one end thereof which is disposed adjacent to and slightly separated from the underside of bars 76 during an operating condition. Pin 128 engages and lifts bar 76 prior to shutdown condition. Lever 124 also has a hinge pin 130, which is fixedly connected to wall 34 for support therefrom. Solenoid 126 turns lever 124 relative to wall 34 thereby lifting bar 76 prior to shutdown and also for positioning bar 76 after start-up.

With this construction, shoe 50 pivots about bolt heads 112, 114 when in a retracted position whereby shoe 50 has a substantially-constant angle of attack when approaching track surface 16. In this way, shoe 50 does not touch track surface 16 under any condition thereby avoiding shoe damage. Transducer 20 is also useful in a disk-type of memory device, which has a flat information-track surface.

In summary, this invention provides a memory transducer, in which tilting and misalignment of the transducer shoe relative to its information track is minimized, which is suitable in combination with a memory drum, in which the quality of pickoff signal is improved and in which disturbances due to vibration and shock loads are minimized.

While the present invention has been described in a preferred embodiment, it will be obvious to those skilled in the art that various modifications can be made therein within the scope of the invention.

What is claimed is:

1. In a memory drum having an inner rotor with a cylindrical outer surface forming a transducer information track and an outer stator with an inner wall conforming substantially to the shape of the rotor, transducers including shoe supports supported by said stator for supporting a plurality of shoes carrying magnetic heads; in said transducers, in combination; a forward section shoe support (58) and a trailing edge pivot means (64), said forward section shoe support (58) having a curved spring strip (82) fixedly connected to said inner wall (34); a flat span bar (76) likewise connected to said inner wall (34), engaged by said curved spring strip (82) at about the mid span thereof; a universal-joint pivot (60) including a single pivot ball (86) fixedly connected to the bar end (78) of said bar (76), a bearing face (90) connected to said shoe (50) disposed so that the ball (86) and the bearing (90) are in bearing and engagement when the transducer (20) is in the operating position and are retracted and disengaged when the transducer is in the shutdown position; said trailing edge point means (64) being offset from said universal joint pivot (60) and includes a pivot ball (92) fixedly connected to the shoe (50) at the trailing edge thereof relative to the direction of travel and has a transversal hinge axis substantially parallel to the plane of travel; adjusting screw means (84) threaded into said wall (34) engaging said curved spring strip (82) for increasing the force of the shoe (50) against a gas film in the gap between the rotor and stator; and, a retractive lever (24) with a lift pin (128) disposed adjacent and under said bar (76) to engage said bar for shutdown condition.

References Cited

UNITED STATES PATENTS

| | | | |
|---|---|---|---|
| 2,961,494 | 11/1960 | Darow et al. | 340—174.1 |
| 3,005,675 | 10/1961 | Ledin et al. | 179—100.2 |
| 3,039,102 | 6/1962 | Fuller et al. | 179—100.2 |
| 3,105,964 | 10/1963 | Kanamuller | 340—174.1 |
| 3,129,297 | 4/1964 | Schlichting | 340—174.1 |
| 3,158,847 | 11/1964 | Pulkrabek | 340—174.1 |
| 3,170,149 | 2/1965 | Koskie et al. | 340—174.1 |
| 3,187,112 | 6/1965 | Smith | 340—174.1 |
| 3,187,315 | 6/1965 | Cheney | 340—174.1 |
| 3,191,165 | 6/1965 | Keel | 340—174.1 |
| 3,193,810 | 7/1965 | Sampson | 340—174.1 |
| 3,193,835 | 7/1965 | Wadey | 340—174.1 |
| 3,292,169 | 12/1966 | D'Alessandro et al. | 340—174.1 |
| 3,310,792 | 3/1967 | Groom et al. | 340—174.1 |
| 3,368,210 | 2/1968 | Zimmer | 340—174.1 |

BERNARD KONICK, *Primary Examiner.*

VINCENT P. CANNEY, *Assistant Examiner.*

U.S. Cl. X.R.

179—100.2